US008843892B2

(12) United States Patent
Hamlin et al.

(10) Patent No.: US 8,843,892 B2
(45) Date of Patent: Sep. 23, 2014

(54) VISUAL REPRESENTATIONS OF CODE IN APPLICATION DEVELOPMENT ENVIRONMENTS

(75) Inventors: Matt Hamlin, San Francisco, CA (US); Thomas E. Bednarz, Jr., Natick, MA (US)

(73) Assignee: Adobe Systems Incorporated, San Jose, CA (US)

( * ) Notice: Subject to any disclaimer, the term of this patent is extended or adjusted under 35 U.S.C. 154(b) by 282 days.

(21) Appl. No.: 12/959,936

(22) Filed: Dec. 3, 2010

(65) Prior Publication Data

US 2013/0239090 A1   Sep. 12, 2013

(51) Int. Cl.
*G06F 9/45* (2006.01)
*G06F 9/44* (2006.01)
*G06F 9/445* (2006.01)

(52) U.S. Cl.
CPC ... *G06F 8/73* (2013.01); *G06F 8/20* (2013.01); *G06F 8/65* (2013.01)
USPC ............ 717/123; 717/120; 717/125; 717/126

(58) Field of Classification Search
CPC ............... G06F 8/10; G06F 8/33; G06F 8/34; G06F 8/73; G06F 8/75; G06F 8/77
USPC .............. 700/18; 707/999.009; 715/781, 255, 715/762, 763, 202; 717/100, 105, 107, 115, 717/106, 113, 125, 141, 109; 345/419, 473, 345/762

See application file for complete search history.

(56) References Cited

U.S. PATENT DOCUMENTS

| | | | | |
|---|---|---|---|---|
| 5,644,334 | A  * | 7/1997 | Jones et al. | 345/419 |
| 5,818,711 | A  * | 10/1998 | Schwabe et al. | 700/18 |
| 5,883,639 | A  * | 3/1999 | Walton et al. | 345/473 |
| 6,212,675 | B1 * | 4/2001 | Johnston et al. | 717/107 |
| 6,684,385 | B1 * | 1/2004 | Bailey et al. | 717/109 |
| 6,993,710 | B1 * | 1/2006 | Coad et al. | 715/202 |
| 7,370,315 | B1 * | 5/2008 | Lovell et al. | 717/100 |
| 2003/0095143 | A1 * | 5/2003 | Lauris | 345/762 |
| 2004/0249813 | A1 * | 12/2004 | Singh et al. | 707/9 |
| 2005/0055666 | A1 * | 3/2005 | Kornerup et al. | 717/105 |

(Continued)

OTHER PUBLICATIONS

Adobe, "Adobe Flex Builder 2", 2007, Adobe Systems Incorporated.*

(Continued)

*Primary Examiner* — Lewis A Bullock, Jr.
*Assistant Examiner* — Gilles Kepnang
(74) *Attorney, Agent, or Firm* — Kilpatrick Townsend & Stockton LLP

(57) ABSTRACT

A device can implement a stage view depicting a visual element for each of a plurality of components of an application under development. The device implements a code overlay showing whether code can be applied to the components and, for components to which code can be applied, a code status indicator. The status indicator may relate to procedural code or to a data member, such as an object or other variable. Different indicators can be used to show that code can be applied, code is applied correctly, incomplete code is applied, or code is applied but contains an error. Different colors or other visual effects can be used to indicate status. The indicators may be selectable to provide a code viewing or editing interface. A status indicator for code associated with a component can be positioned near the visual representation of the component, but may be repositionable.

20 Claims, 5 Drawing Sheets

(56) References Cited

U.S. PATENT DOCUMENTS

| | | |
|---|---|---|
| 2005/0138601 A1* | 6/2005 | Simonoff et al. ............ 717/105 |
| 2007/0277149 A1* | 11/2007 | Stevens ........................ 717/105 |
| 2008/0215968 A1* | 9/2008 | Bekerman .................... 715/255 |
| 2008/0307388 A1* | 12/2008 | Ralls et al. ................... 717/115 |
| 2009/0070738 A1* | 3/2009 | Johnson ....................... 717/106 |
| 2009/0204926 A1* | 8/2009 | Cochrane ..................... 715/781 |
| 2009/0288073 A1* | 11/2009 | Gosalia et al. ............... 717/141 |
| 2010/0017788 A1* | 1/2010 | Bronkhorst et al. ......... 717/125 |
| 2010/0058292 A1* | 3/2010 | Nattinger ..................... 717/113 |
| 2011/0010644 A1* | 1/2011 | Merrill et al. ................ 715/762 |

OTHER PUBLICATIONS

Green, Tom et al., "Audio in Flash CS3", 2007, Apress.*
Interface Builder User Guide, available at http://developer.apple.com/library/mack/documentation/DeveloperTools/Conceptual/IB_B_UserGuide/IB_UserGuide.pdf (last accessed Nov. 22, 2010).
Adobe Systems Incorporated, Using Adobe Flash CS4 Professional (Mar. 5, 2009).

* cited by examiner

VISUAL REPRESENTATIONS OF CODE IN APPLICATION DEVELOPMENT ENVIRONMENTS

BACKGROUND

Software developers use application development environments (ADEs) to write code defining the visual appearance and behavior of an application under development. As an example, a developer of an application, such as an Adobe® Flash® or Adobe® AIR® application, may use an ADE that allows the developer to place media components (e.g., images, movieclips, etc.) on a stage and define a desired visual arrangement of the components, along with changes in the composition and/or position of the components as the application executes.

The goal in using the ADE is to generate suitable code so that when the application is executed or interpreted, the media components are rendered and behave as desired in response to input events and other conditions. For example, a scripting language (such as ActionScript®) can be used to define code that causes the application to take an action, such as jumping to a visual arrangement labeled as a frame, in response to an event. The action may be associated with one of the media elements. For instance, the developer may position an element, such as a button, on the stage and then associate an event handler with the button by writing procedural code that defines one or more operations (e.g., a change in the appearance of the button or the scene) in response to a pointer clicking, hovering, or otherwise interacting with the button.

As another example, the code can define data variables. For example, a text entry box may be associated with a variable representing the content text entered in the box. Additionally or alternatively, the content of the box may be bound to a variable defined elsewhere.

SUMMARY

A device can implement a stage view module to depict a visual element corresponding to each of a plurality of components of an application under development, the stage view presented in a graphical user interface. The device can also implement a code overlay module to determine, for some or all of the visual element in the stage view, whether code can be applied to the corresponding application component, and to present, for each application component to which code can be applied, a code status indicator. The code status indicator(s) can be presented in a layer atop the stage.

The code status indicator may relate to procedural code or to a data member, such as an object or other variable. Different indicators can be used to show statuses including (but not limited to): code can be applied to the application component but is not applied, code is applied correctly, code is applied but is incomplete, or code is applied but contains an error. Different colors or other visual effects can be used to indicate status. The indicators may be selectable to provide a code viewing or editing interface. A status indicator for code associated with a component can be positioned near the visual representation of the component, but may be repositionable.

This illustrative embodiment is discussed not to limit the present subject matter, but to provide a brief introduction. Additional embodiments include computer-readable media embodying an application configured in accordance with aspects of the present subject matter to provide a timeline view including one or more scripting tracks, along with computer-implemented methods for providing timeline views with scripting tracks. These and other embodiments are described below in the Detailed Description. Objects and advantages of the present subject matter can be determined upon review of the specification and/or practice of an embodiment configured in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Tools such as Adobe® Flash® Professional, available from Adobe Systems Incorporated of San Jose, Calif., provide a stage view for arranging visual representations of application components and a code view for defining actions and data values. However, developers may be hindered by switching between the visual design in the stage view and the textual representation in the code view. Additionally, not all developers may be aware of which application components have code, or potentially could have code, applied to them.

Figure 1:
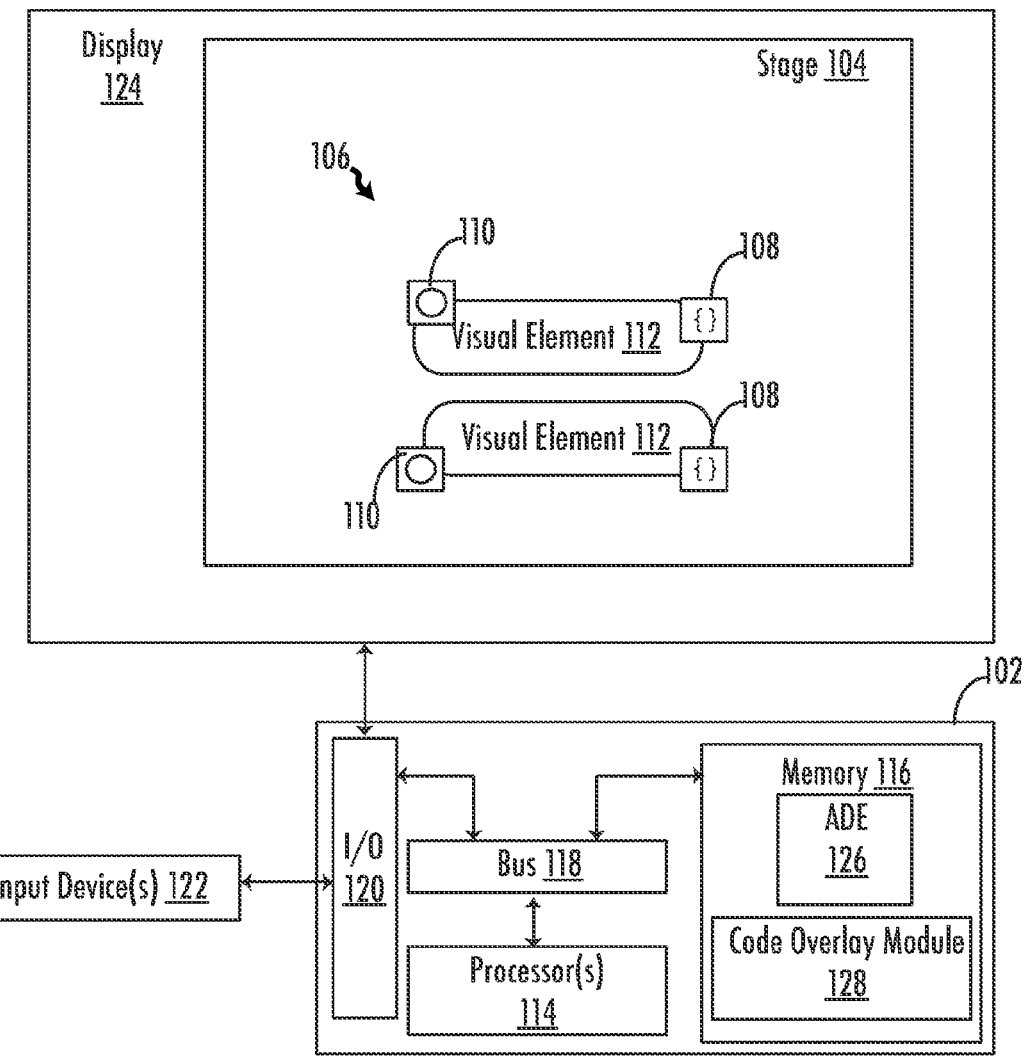
FIG. 1 is a block diagram showing an illustrative computing device implementing a visual code overlay.

Presently-disclosed embodiments include computing systems, methods, and computer-readable media for implementing a code overlay in a graphical user interface that includes a stage view. As shown in FIG. 1, a computing device 102 provides a graphical user interface that includes a stage view 104 with a code overlay 106. The code overlay includes a plurality of code status indicators 108, 110, which are positioned proximate visual elements 112 of the stage view that correspond to various components of the application. The code status indicators can visually indicate whether code can be applied to an application component and, for components to which code is applied, whether the code is complete or contains an error. Additionally or alternatively, the code status indicator may show one or more object variables associated with the application and/or specific application components.

Providing a code overlay can allow a user to easily distinguish and select code entities within projects without the need to understand all of the source code for an application. Additionally or alternatively, a more textual-oriented developer can be provided textual cues alongside the visual representation of his or her work. The code overlay can streamline the development process and help the developer's workflow by integrating the visual and textual representations of the application under development.

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment.

In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

FIG. 1 is a diagram showing an example of a computing device 102, which alternately may be referred to as a data processing system, computerized device, or simply a "computer." Computing device 102 represents a desktop, laptop, tablet, or any other computing system, such as mobile devices (PDAs, smartphones, media players, gaming systems, etc.), servers, or embedded systems (e.g., in vehicles, appliances, or other devices).

In the example shown in FIG. 1, computing device 102 features a data processing hardware element comprising one or more processors 114 and a computer-readable medium 116 (memory in this example) interconnected via internal busses 118, connections, and the like. Bus 118 also connects to I/O components 120, such as universal serial bus (USB), VGA, HDMI, or other display adapter(s), serial connectors, and/or other I/O connections to other hardware of the computing system. One or more input devices 122 comprise hardware used to provide input—examples include a keyboard, trackpad, mouse, and/or touch-sensitive display, etc. Additionally, FIG. 1 shows a display 124. It will be understood that computing device 102 could include other components, such as storage devices, communications devices (e.g., Ethernet, radio components), and other I/O components such as speakers, a microphone, or the like.

Computer-readable medium 116 may comprise RAM, ROM, or other memory and in this example embodies program logic for an application development environment (ADE) 126 and a code overlay module 128. Code overlay module 128 can be integrated into ADE 120 or may be a separate program component or process. In one implementation, code overlay module 128 is included in an ADE such as Adobe® Flash® Professional, available from Adobe Systems Incorporated of San Jose, Calif., and can be used to develop Adobe® Flash® or AIR® applications and/or applications of another type. This example shows a locally-executing code overlay module and ADE, but either or both components could be hosted at a remote server and accessed by a client device, with the client using a client-side front end to provide a UI based on data received from the hosted service.

Generally speaking, a computing device 102 implementing code overlay module 128 can determine, for each visual element presented in the stage view 104, whether code can be applied to the corresponding application component. For some or all of the application components to which code can be applied, the computing device presents a code status indicator (108, 110). The code overlay 106 may be toggled using a selector such as a textbox, menu item, and/or in response to a key combination or other input.

Code overlay module 128 can be implemented in software as shown in this example, or could be implemented using hardware accessible by or as part of the data processing element (e.g., as an application-specific integrated circuit, (ASIC) or programmable logic device (e.g., PLAs, FPGAs, etc.)).

The stage view 104 can be provided by a corresponding stage view module to depict one or more visual elements 112 corresponding to each of a plurality of components of an application under development and, like the code overlay, the stage view is presented in a graphical user interface provided via the display adapter. Visual elements 112 can correspond to intended visual components to be displayed by the application under development, but visual elements 112 may also include representations for non-visual components of the application such as audio components.

Depending on how the stage view 104 is provided, different combinations ("scenes") of visual elements 112 may be presented. For example, the ADE may use a timeline to represent different screens of the application under development (e.g., for different portions of an animation, different interface states, etc.). Stage 104 may include visual elements 112 associated with a selected point in the timeline, and so the visual elements 112 provided onscreen may change as different portions of the timeline are selected by moving a playhead, selecting a frame number, etc. As the visual elements change for different parts of the timeline, code status indicators 108/110 may be added, removed, and/or repositioned.

Figure 2A:
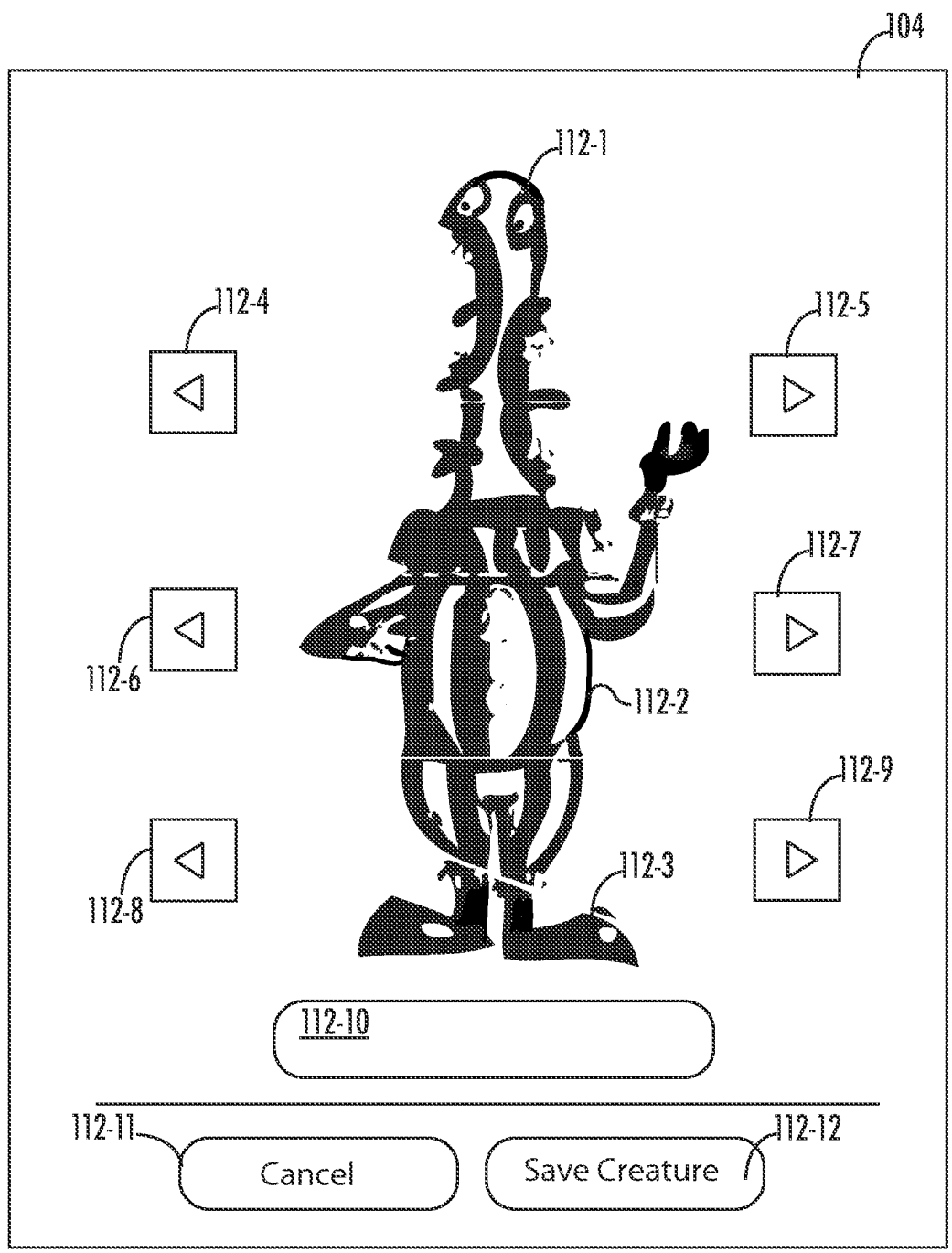
FIG. 2A illustrates an example of a stage depicting visual elements that represent various components of an application under development.

FIG. 2A shows an illustrative stage view 104. For this example, assume a developer is designing a "creature builder" application or component that allows end-users to select a head, torso, and feet for a fanciful creature. The selected creature can then be named and saved for use elsewhere (e.g., in a game). To design this application, the developer arranges three image components in an interface for the end user to preview the creature. Thus, stage 104 includes a representation 112-1 of the head component, a representation 112-2 of the torso component, and a representation 112-3 of the feet component. The components may be, for example, image objects that update in response to selection actions, with representations 112-1, 112-2, and 112-3 displaying a default view for the image components while the application is under development in the ADE.

To facilitate selection by the end user, the developer arranges selection buttons or other interface components. As shown in stage 104, representations 112-4 and 112-5 correspond to buttons to be used to toggle through heads for the creature. Similarly, representations 112-6 and 112-7 correspond to buttons to be used to toggle through torsos, while representations 112-8 and 112-9 correspond to buttons to be used to toggle through feet. To complete the interface under design, the developer adds a text box represented at 112-10 to provide for entry of a name for the creature, and "cancel" and "save" buttons represented at 112-11 and 112-12 to provide commands to the application under development to save or discard the creature.

Stage view 104 thus provides a visual representation of components of the application under development. In some implementations, the code of the application is updated in response to a developer adding/manipulating elements 112 in the stage. However, in order to produce a working application, the visual and other components of the application will need to be tied to underlying program logic of the application. As noted above, the ADE may provide a code view whereby the developer can specify procedural and other code using a textual interface. However, the development process may be enhanced through use of a code overlay 106 that visually associates the code aspects of the application with the visual representation of the application.

Figure 2B:
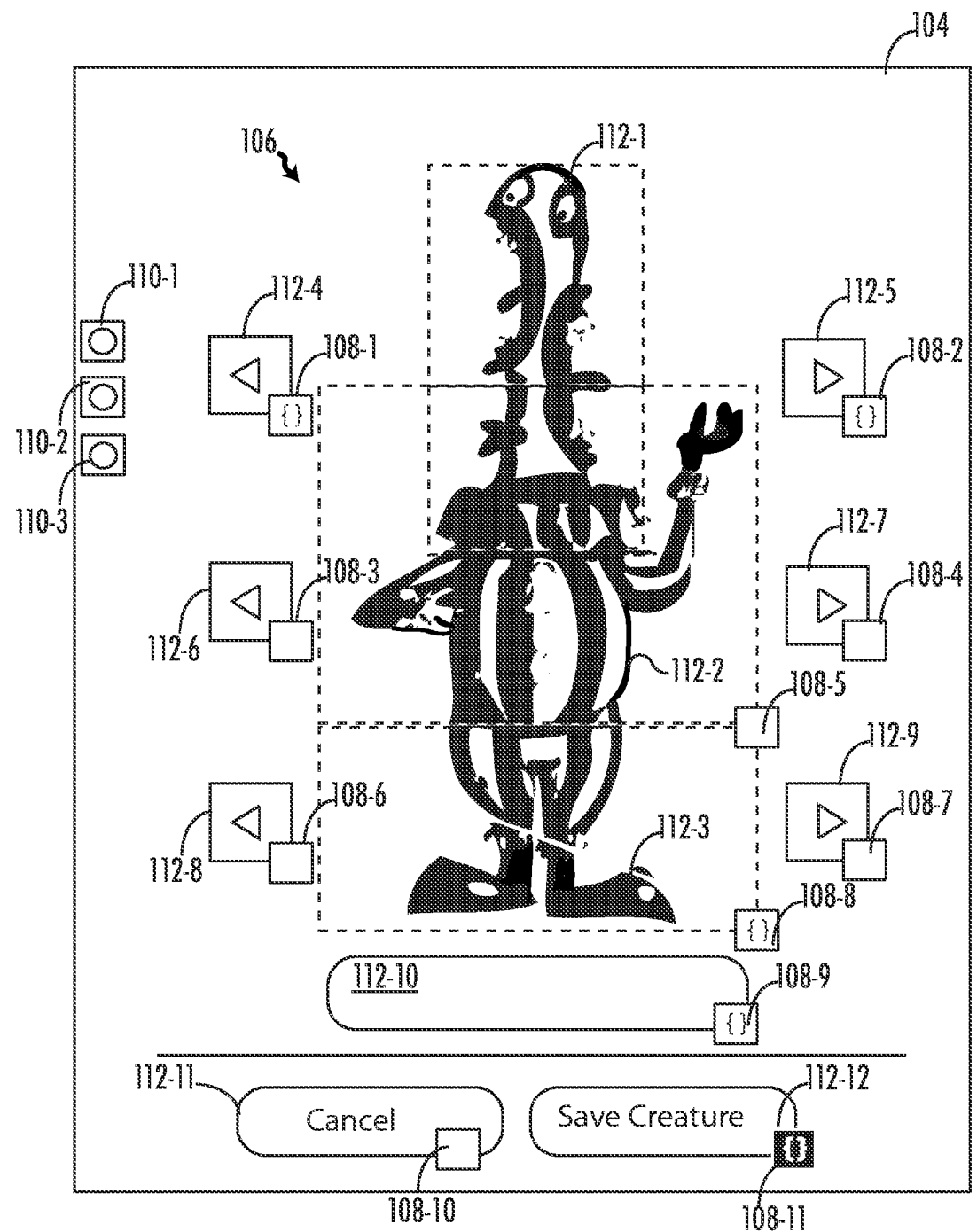
FIG. 2B illustrates an example of a visual code overlay as applied to visual elements of FIG. 2A.

FIG. 2B shows an example of a code overlay 106 as applied to the visual representation of the application depicted in FIG. 2A. Code overlay 106 includes a plurality of code status indicators 108 and 110. In this example, code status indicators 108 indicate a status of procedural code, while status indicators 110 indicate a status of data members such as object variables. The code status indicators in this example provide a direct visual indication of application components to which code can be applied and (for components with code applied already) information about the code that is applied. As shown by the dashed boxes, the code overlay also provides borders around elements in the stage view; this may help to identify components to which code can be applied and to help associate code status indicators with particular elements.

As shown in FIG. 2B, status indicators 108-1 and 108-2 comprise icons that are positioned proximate their respective visual elements 112-4 and 112-5. For example, the code overlay module may determine default coordinates for rendering code status indicators so that each status indicator for code associated with an application component overlays or is otherwise positioned proximate the visual element 112 representing the application component. In this example, code status indicators 108-1 and 108-2 also include curly braces "{ }" to indicate that code is applied to elements 112-4 and 112-5. Text, numbers, and/or other graphical effects can be used to indicate different statuses of applied code. Non-visual feedback could be provided in addition to visual feedback.

Code overlay 106 further comprises code status indicators 108-3, 108-4, 108-5, 108-6, and 108-7. These code status indicators also comprise icons, but with a different appearance than status indicators such as 108-1 and 108-2. For example, an icon with a different color may be used to indicate that code could be applied but is not currently applied. For instance, elements 112-6, 112-7, 112-8, and 112-9 comprise button components, but status indicators 108-3, 108-4, 108-6, and 108-7 may be provided to indicate that code has not yet have been written or inserted to tie the buttons to the desired functionality of toggling the torso and feet portions of the creature. Status indicator 108-5 is positioned near an outline for torso element 112-2 and indicates how code could be applied to the torso element as well.

Status indicator 108-8 again features curly braces, for example to indicate that "feet" element 112-3 has code applied thereto. Status indicator 109-9 may indicate that text box component represented by element 112-10 also has applied code. For example, the applied code may take the input provided via the textbox component represented at 112-10 and store the text as a variable "CreatureName."

Status indicator 108-10 shows that the "cancel" button component represented by element 112-11 does not yet have code applied. Status indicator 108-11, on the other hand, features a different appearance than status indicators such as 108-1 and 108-3. For example, a different color or icon can be used to represent an error condition in applied code or to indicate that code is applied but is incomplete. For example, a user may have applied a template to the "save" button component but may not have completed the template or may have completed the code in a way that presents an error.

Code overlay 106 further includes a plurality of code status indicators 110-1, 110-2, and 110-3 representing data members such as object variables applicable to one or more application components. In this example, indicators 110 are presented to the side of elements 112 to avoid obscuring the elements. It will be understood that an object variable indicator associated with a particular application component could be rendered near the corresponding visual element 112. For example, indicators 110-1, 110-2, and 110-3 may each correspond to a variable used to identify the selected head, torso, and feet sections of the creature under design.

In this example, the code status indicators are provided as icons. The icons may be any suitable shape or appearance. Different markings, colors, and/or other visual properties can be used to indicate different statuses for the code. For example, a gray placard may indicate that code could be applied to an element. A white placard with curly braces may indicate code is applied, while a red placard may indicate that applied code has one or more errors. A yellow placard may indicate that a template has been applied but is not complete, or code with that status may simply be deemed to have an error. Other colors, text, and/or placard shapes can be used to indicate code status as well, and implementations can also use visual effects such as transparency, animation, and the like.

Figure 3:
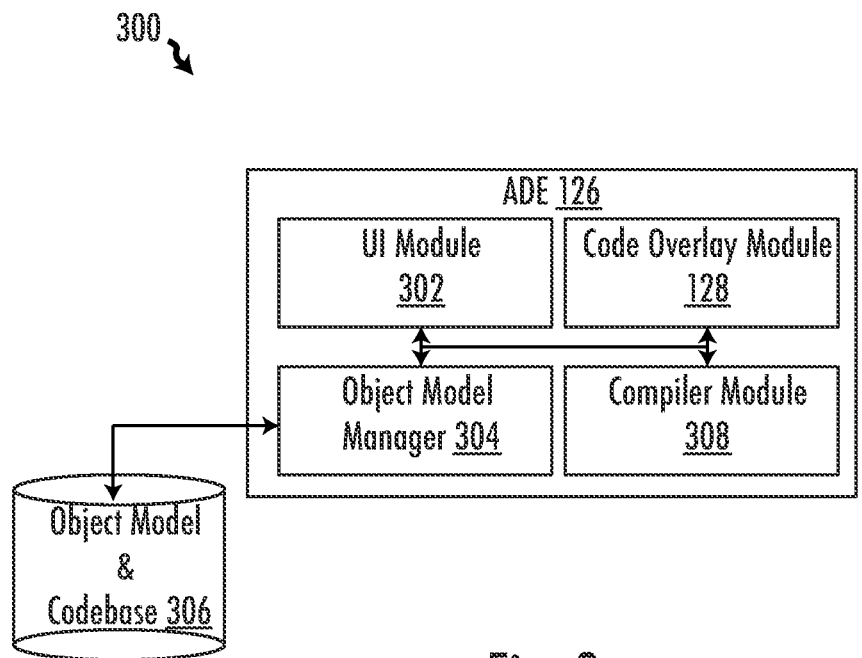
FIG. 3 is a diagram of an illustrative software architecture for a development environment that provides a visual code overlay.

FIG. 3 is a diagram showing an illustrative architecture 300 for an application development environment 120 that includes a code overlay module 128. In this example, application development 120 includes a UI module 302 used to provide a graphical user interface and receive user input. For example, the interface can include a design stage and other interfaces (e.g., code view interface, timeline, etc.). Object model manager module 304 can access stored data representing a core object model and codebase 306 for the application under development. The object model/codebase can include data representing the various application components, including media elements, scripting components, and the like.

The application components can be indexed by frame or other identifiers used by object model manager 304 in tracking and updating the data defining the application under development. UI module 302 can use this information to populate the stage view with visual elements 112, such as by determining a desired frame or other point on a timeline for an application and determining components associated with that frame. Code overlay module 128 can determine, for each component associated with the frame, whether the component can have code applied and/or whether code is applied based on the component type and an identifier for the component. For example, module 128 can determine whether code can be applied based on the type of component (e.g., the component's class) and can determine whether code is applied by searching the codebase or object model.

ADE 120 also includes compiler module 308. Compiler module 308 can use the object model/codebase to produce executable or interpretable code of the application under development. Output code may, for example, comprise SWF files or AIR files for execution using Adobe® Flash® or AIR®, files for execution in another runtime environment, files for execution in an operating system, or other code such as HTML/CSS code. It will be understood that the present subject matter can be used regardless of the format or type of the application under development, and construction and use of appropriate compilers, linkers, and packaging components (e.g., for cross-platform compatibility) will be within the ability of one of skill in the art.

Figure 4:
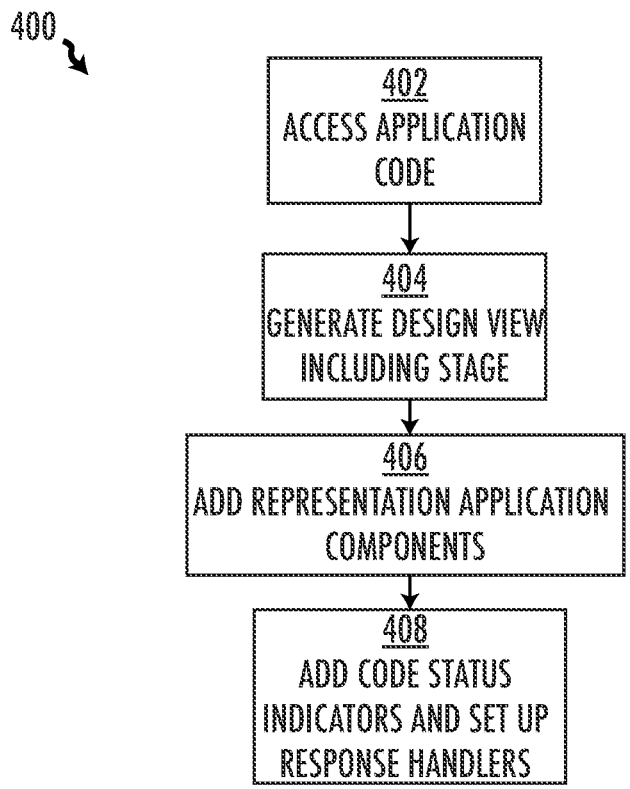
FIG. 4 is a flowchart showing steps in an illustrative processing method for providing a visual code overlay.

FIG. 4 is a flowchart showing steps in an illustrative processing method 400 that may be carried out by a computing device 102 implementing a code overlay module 128. Block 402 represents accessing code or another representation of an application stored in a memory, the code defining a plurality of media components of the application and at least one scripting action or label. For example, as noted above, an ADE may maintain a model of the application under development from a codebase and update that model in response to user input. Information in the model and/or codebase can be accessed at block 402 for use in providing the code overlay.

Block 404 represents generating a design view in a graphical user interface, the design view including a stage. For example, as noted above, the codebase and/or model can be accessed to determine various components of the application and corresponding visual elements for representing those elements on the stage. In some implementations, this may entail determining a desired frame or other point on a timeline for the application (i.e. a particular scene) and determining which application components will be visually rendered or otherwise active at that scene. The visual elements can then be rendered on the stage at block 406. For example, visual elements corresponding to images, movieclips, interface elements (e.g., buttons, text boxes, etc.) can be arranged on the stage. As noted above, the visual elements can also correspond to non-visual application components such as sounds, non-graphic event generators (e.g., an object that responds to key combinations or external vents), and the like.

Block 408 represents adding code status indicators and setting up event handlers of the ADE to provide responses to events designating or associated with the code status indicators. As noted above, in some cases the code overlay may be toggled on and off. Thus, block 408 may determine code status indicators but may not actually render those indicators unless the code overlay is enabled.

An example of determining code status indicators is provided below in FIG. 5. Generally speaking, the code status indicators can be determined by analyzing data defining the application under development and selecting a corresponding status indicator in response to the analysis. For example, the indicators can be selected by determining the identity of each application component represented on the stage and then consulting the codebase and/or object model for the application under development. As noted above, a link between one or more segments of code and an application component can be determined based on code syntax indicating a reference to the application component. For data members, a check for variables associated with the class(es) of objects on the screen can be made, with appropriate status indicators added for each data member.

The event handlers may provide for additional interface behavior associated with the status indicators in the overlay. For example, in some implementations selection of a code status indicator can spawn an interface to view code, or an interface to apply code to an element. As a particular example, a popup window showing segment(s) of applied code may be provided in response to a click gesture and/or the code view may be updated to show the corresponding application code. As another example, a mouseover gesture may provide a tooltip or other description of the applied code. As a further example, the code status indicators may respond to input gestures, such as drag gestures, to apply code to an element of the application. For instance, a developer may identify a segment of code and drag the segment onto a code status indicator to apply the code to the corresponding application component.

Similar behavior may be provided for code status indicators related to data members. For example, a mouseover gesture may spawn a tooltip or other help describing the variable(s) represented by the code status indicator. The status indicator may be clickable to provide an interface to edit the code that defines the variable(s) and/or to update the code view to allow editing of the code.

Method 400 is provided for purposes of illustration only. In practice, an ADE may carry out multiple concurrent processes. For example, the code overlay can be updated periodically and/or in response to other input changing the composition of the application. For example, if a developer adds a new component to a scene, a corresponding visual element can be added on the stage and, if the new component can have code applied thereto, appropriate placards or other status indicators may be added. As another example, if a different portion of the timeline is selected, the visual elements can be updated accordingly to reflect a different scene or segment of the application, with existing code status indicators moved or removed and new status indicators added according to the components of the new scene/segment.

Figure 5:
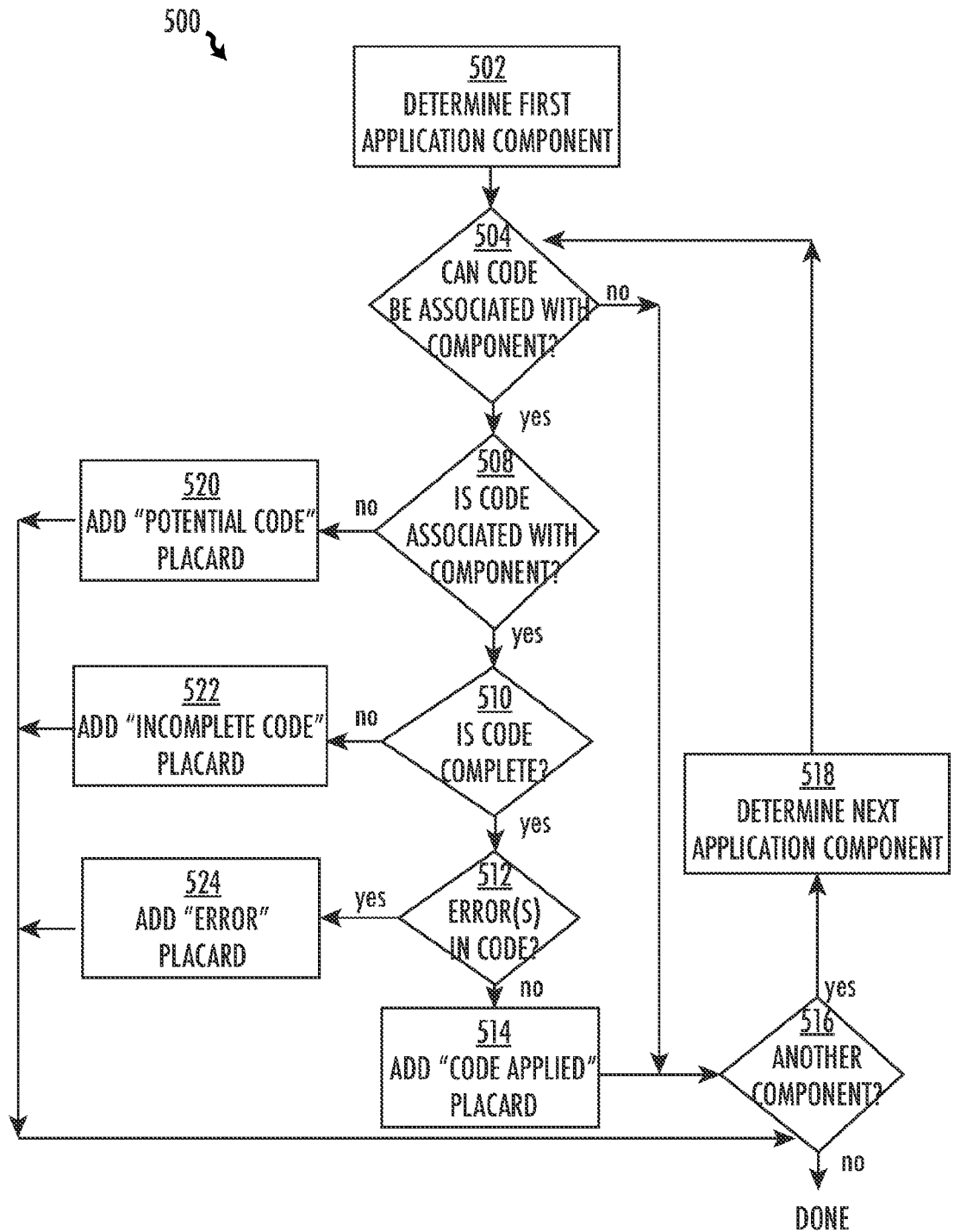
FIG. 5 is a flowchart showing steps in an illustrative processing method for providing code status indicators in a visual code overlay.

FIG. 5 is a flowchart showing an illustrative method 500 for determining code status indicators to provide in a code overlay. Block 502 represents determining the first application component represented using a visual element on a stage. For example, a list of objects may be associated with a frame or other marker used to select a scene of an application.

Block 504 represents determining whether code can be associated with the component. Some components may not have code applied directly—for example, a container or other component may be restricted from having code applied. If such a component is encountered, the method moves to block 516, which represents determining whether there are other components to consider and, if so, determining the next component at block 518. If at block 516, there are no further components to consider, method 500 is complete.

Returning to block 504, assuming that code can be applied to the element, the method proceeds to block 508, which represents determining whether code is associated with the element. For instance, the object model for the application under development can be searched for procedural code or data members associated with the application component by using an identifier for the component. As another example, the source code for the application can be searched to identify code referencing the component, with logical blocks of code recognized based on code syntax.

If at block 508, no code is found, then the method moves to block 520, which represents adding a "potential code" placard or other indicator to the stage for display with the visual element representing the application component. The method then proceeds to consider the next component, if any.

For example, if one or more data members can be defined for the application component, appropriate status indicators 110 can be added. If procedural code can be applied to the component, an appropriate status indicator 108 can be added. Practically, method 500 may generate a list of status indicators by type and referencing corresponding application components and provide the list to a rendering process to actually add the status indicator graphic(s) to the stage. Thus, the steps of "adding" placards should be understood in that context.

Returning to block 508, if code is associated with the component, method 500 can check to see if there are any substantive aspects to the code that need to be considered. In this example, the method checks at block 510 to determine if the code is complete and at block 512 to determine if the code contains an error. It will be understood that more in-depth analysis of the code may be carried out, with any number of placards corresponding to the analysis results. For example, a code status indicator may be provided for code with no errors, but with warnings similar to warnings that may be provided during compilation.

If the code is not complete, then the method proceeds from block 510 to block 522 to add an "incomplete code" placard. If, on the other hand, the code is complete but contains an error, the method proceeds to block 524 to add an "error" placard. Errors can be identified in any suitable way. For example, the code syntax can be checked against data defining proper syntax, and references to variables and other data members can be checked for validity. The "completeness" of code may be checked in the same way and/or may rely on tracking user activity. For example, if a user applies a code template to an element, the ADE may set a flag that remains set until the code is completed.

If at blocks 510 and 512, no errors are found, the method moves to block 514 to ad a "code applied" placard for the component and then moves to determine the status of the next component, if any.

Additionally, as noted above, the code status indicators may change as different scenes of the application are selected. In various implementations, all code status indicators can be determined across the entire application timeline and can be selected from a list based on the particular scene depicted on the stage. Alternatively, the code status indicators can be determined on a scene-by-scene basis.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

A computing device may access one or more non-transitory computer-readable media that embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, mobile devices (e.g., tablets, smartphones, personal digital assistants (PDAs), etc.) televisions, television set-top boxes, portable music players, and consumer electronic devices such as cameras, camcorders, and mobile devices. Computing devices may be integrated into other devices, e.g. "smart" appliances, automobiles, kiosks, and the like.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computer-implemented method, comprising:
    generating a stage view comprising a plurality of visual elements within a graphical interface of an application under development, wherein each of the plurality of visual elements is associated with a respective component of a plurality of components of the application under development, wherein the plurality of components provide functionality for the plurality of visual elements within the graphical interface of the application under development;
    presenting the stage view in a development interface of a development environment, wherein the development environment modifies the application under development;
    applying a code overlay to the stage view in response to the development environment receiving an input for activating the code overlay, the code overlay mapping visual indicators to the plurality of visual elements;
    determining, for at least some of the visual elements of the plurality of visual elements, that respective code can be applied to the respective component associated with the visual element of the graphical interface; and
    in response to each determination that the respective code can be applied to the respective component, updating a respective visual indicator that is rendered and overlaid on the stage view in the development interface, wherein the respective visual indicator is rendered adjacent to a respective visual element for a respective component associated with the visual indicator, and wherein the respective visual indicator is indicative of a respective status of the respective code applied to the respective component associated with the visual element.

2. The method of claim 1, wherein the respective visual indicator comprises an outline rendered on or around the visual element.

3. The method of claim 1, wherein the respective visual indicator comprises a visual placard rendered on or adjacent to the visual element, wherein respective code is applicable to the visual element.

4. The method of claim 1, further comprising:
determining that at least one portion of the respective code applied to a corresponding component for at least one visual element of the plurality of visual elements contains an error; and
rendering a visual indicator indicating that the code that is applied to the corresponding component contains the error, the rendered visual indicator having a different appearance from another visual indicator used to indicate that code is applied to the respective component.

5. The method of claim 1, wherein the respective visual indicator is selected from a first visual indicator corresponding to a code portion with no errors, a second visual indicator corresponding to a code portion that requires completion, and a third visual indicator corresponding to a code portion that contains an error.

6. The method of claim 1, further comprising, for at least one visual element of the plurality of visual elements:
identifying an object variable for code that can be applied to a corresponding component for the at least one visual element, and rendering a visual indicator of the object variable in the stage view, the visual indicator of the object variable selectable to provide an editing interface within the stage view to edit the object variable.

7. The method of claim 1, wherein, for a particular collection of the plurality of visual elements, each visual element of that collection applies code to a respective component corresponding to the visual element, and wherein the code comprises updating image content by executing the respective code in response to a respective selection action in the graphical interface.

8. The method of claim 1, wherein, for a particular collection of the plurality of visual elements, each visual element of that collection applies code to a respective component corresponding to the visual element, and wherein the code comprises playing audio content by executing the respective code.

9. The method of claim 1, wherein generating the stage view further comprises generating as a plurality of additional visual elements corresponding to respective components of an additional plurality of components of the application under development; and
further comprising:
determining, for each visual element of the plurality of additional visual elements, that code cannot be applied to a respective component corresponding to the visual element; and
presenting the plurality of additional visual elements without code status indicators in response to determining that code cannot be applied to the respective component corresponding to each visual element of the plurality of additional visual elements.

10. The method of claim 9, wherein the stage view comprises a preview of a presentation comprising a combination of the plurality of visual elements and the plurality of additional visual elements, and wherein the presentation is presented by executing the application under development.

11. A non-transitory computer-readable medium tangibly embodying program code executable by a processor, the non-transitory computer-readable medium excluding signals, wherein the program code comprises:
program code for generating a stage view comprising a plurality of visual elements within a graphical interface of an application under development, wherein each of the plurality of visual elements is associated with a respective component of a plurality of components of the application under development, wherein the plurality of components provide functionality for the plurality of visual elements within the graphical interface of the application under development,
program code for presenting the stage view in a development interface of a development environment, wherein the development environment modifies the application under development;
program code for applying a code overlay to the stage view in response to the development environment receiving an input for activating the code overlay, the code overlay mapping visual indicators to the plurality of visual elements;
program code for determining, for at least some of the visual elements of the plurality of visual elements, that respective code can be applied to the respective component associated with the visual element of the graphical interface; and
program code for updating a respective visual indicator that is rendered and overlaid on the stage view in the development interface in response to each determination that the respective code can be applied to the respective component,
wherein the respective visual indicator is rendered adjacent to a respective visual element for a respective component associated with the visual indicator, and
wherein the respective visual indicator is indicative of a respective status of the respective code applied to the respective component associated with the visual element.

12. The non-transitory computer-readable medium of claim 11, further comprising:
program code for determining that no portion of code is applied to a corresponding component for at least one of the visual elements of the plurality of visual elements;
and program code for rendering a visual indicator that no code is applied to the corresponding component in response to determining that no portion of code is applied to the corresponding component, wherein the visual indicator that no code is applied to the component has a different appearance from an additional visual indicator that code is applied to an additional corresponding component for at least another of the visual elements of the plurality of visual elements.

13. The non-transitory computer-readable medium of claim 11, further comprising program code for presenting a code view interface providing a textual view of code associated with one of the plurality of visual indicators in response to input selecting at least one of the plurality of visual indicators.

14. The non-transitory computer-readable medium of claim 11, wherein the program code for rendering the respective visual indicator on the stage view that is indicative of the respective status of the respective code applicable to the visual element comprises:
- identifying a first status indicator indicating that code can be applied to the respective component but is not applied;
- identifying a second status indicator indicating that code is applied to the respective component;
- identifying a third status indicator indicating that code is applied to the respective component but is incomplete;
- identifying a fourth status indicator indicating that code is applied to the respective component and that the code that is applied to the component includes an error;
- selecting one of the first status indicator, the second status indicator, the third status indicator, and the fourth status indicator; and
- rendering the selected one of the first status indicator, the second status indicator, the third status indicator, and the fourth status indicator.

15. The non-transitory computer-readable medium of claim 11, wherein the program code for rendering the respective visual indicator on the stage view that is indicative of the respective status of the respective code applicable to the visual element comprises:
- identifying a first type of visual indicator indicating a status of procedural code defining at least one operation performed by the respective component;
- identifying a second type of visual indicator describing a variable applicable to the respective component;
- selecting at least one of the first type of visual indicator and the second type of visual indicator;
- and rendering the at least one of the first type of visual indicator and the second type of visual indicator.

16. A system comprising:
- a processor; and
- a non-transitory computer-readable medium communicatively coupled to the processor, the non-transitory computer-readable medium tangibly embodying program code executable by the processor,
- wherein the processor executes the program code to perform operations comprising:
  - generating a stage view comprising a plurality of visual elements within a graphical interface of an application under development, wherein each of the plurality of visual elements is associated with a respective component of a plurality of components of the application under development, wherein the plurality of components provide functionality for the plurality of visual elements within the graphical interface of the application under development;
  - presenting the stage view in a development interface of a development environment, wherein the development environment modifies the application under development;
  - applying a code overlay to the stage view in response to the development environment receiving an input for activating the code overlay, the code overlay mapping visual indicators to the plurality of visual elements;
  - determining, for at least some of the visual elements of the plurality of visual elements, that respective code can be applied to the respective component associated with the visual element of the graphical interface; and
  - updating a respective visual indicator that is rendered and overlaid on the stage view in the development interface in response to each determination that the respective code can be applied to the respective component,
  - wherein the respective visual indicator is rendered adjacent to a respective visual element for a respective component associated with the visual indicator, and
  - wherein the respective visual indicator is indicative of a respective status of the respective code applied to the respective component associated with the visual element.

17. The system of claim 16, wherein generating the stage view further comprises generating a plurality of additional visual elements corresponding to respective components of an additional plurality of components of the application under development; and wherein the processor is further configured to perform additional operations comprising:
- determining, for each visual element of the plurality of additional visual elements, that code cannot be applied to a respective component corresponding to the visual element; and
- presenting the plurality of additional visual elements without code status indicators in response to determining that code cannot be applied to the respective component corresponding to each visual element of the plurality of additional visual elements.

18. The system of claim 17, wherein the stage view comprises a preview of a presentation comprising a combination of the plurality of visual elements and the plurality of additional visual elements, wherein processor presents the presentation by executing the application under development.

19. The system of claim 18, wherein the plurality of visual elements and the plurality of additional visual elements comprise a plurality of portions of a visual object in the presentation.

20. The system of claim 16, wherein the respective status of the respective code is indicated using different colors for different code statuses.

* * * * *